(12) United States Patent
Nalawade et al.

(10) Patent No.: US 7,359,393 B1
(45) Date of Patent: Apr. 15, 2008

(54) METHOD AND APPARATUS FOR BORDER GATEWAY PROTOCOL CONVERGENCE USING UPDATE GROUPS

(75) Inventors: Gargi Nalawade, Santa Clara, CA (US); David Alexander Ball, Harpenden (GB)

(73) Assignee: Cisco Technology, Inc., San Jose, CA (US)

( * ) Notice: Subject to any disclaimer, the term of this patent is extended or adjusted under 35 U.S.C. 154(b) by 973 days.

(21) Appl. No.: 10/639,005

(22) Filed: Aug. 11, 2003

(51) Int. Cl.
*H04L 12/28* (2006.01)
*H04L 12/56* (2006.01)

(52) U.S. Cl. .................. 370/401; 370/254; 370/400; 704/243; 704/244; 707/6

(58) Field of Classification Search ............ None
See application file for complete search history.

(56) References Cited

U.S. PATENT DOCUMENTS

| | | | |
|---|---|---|---|
| 6,392,997 B1 * | 5/2002 | Chen | 370/252 |
| 6,938,095 B2 * | 8/2005 | Basturk et al. | 709/238 |
| 2006/0098577 A1 * | 5/2006 | MeLampy et al. | 370/238 |

OTHER PUBLICATIONS

Rekhter & Gross, Editors, entitled "Application of the Border Gateway Protocol in the Internet" (RFC 1772), Network Working Group dated Mar. 1995, (pp. 1-19), http://www.ietf.org/rfc/rfc1772.txt.

Y. Rekhter, Editor, entitled "RFC 1266—Experience with the BGP Protocol", Network Working Group dated Oct. 1991, (pp. 1-9), http://www.faqs.org/rfcs/rfc1266/html.

Rekhter & Li, Editors, entitled "A Border Gateway Protocol 4 (BGP-4)" (RFC 1771), Network Working Group dated Mar. 1995, (pp. 1-57), http://www.ietf.org/rfc/rfc1771.txt.

P. Traina, Editor, entitled "BGP-4 Protocol Analysis" (RFC 1774), Network Working Group dated Mar. 1995, (pp. 1-10), http://www.ietf.org/rfc/rfc1774.txt.

Cisco Systems entitled, "Cisco IOS Software Releases 11.0, Configuring IP Routing Protocols", (pp. 1-112), ®1992-2003 Cisco Systems, Inc., updated Sep. 9, 2002, www.cisco.com/en/US/products/sw/iosswrell/ps1818/products_configuration_guide_chapter09186a0080....

Cisco Systems, entitled "Cisco IOS Software Releases 12.0 S, Emplicit Tracking of Hosts, Groups, and Channels for IGMP Version 3", (pp. 1-9), ®1992-2003 Cisco Systems, Inc., updated Jan. 17, 2003, http://www.cisco.com/en/US/products/sw/iosswrell/ps1829/products_feature_guide09186a00....

Cisco Systems entitled "Troubleshooting High CPU Caused by the BGP Scanner or BGP Router Process", Document ID:45620, dated Sep. 29, 2003, (10 pgs).

* cited by examiner

*Primary Examiner*—Chirag G. Shah
(74) *Attorney, Agent, or Firm*—Hickman Palermo Truong & Becker LLP

(57) ABSTRACT

A method and apparatus for establishing update groups of peers having matching outbound policies are disclosed. When a change in the outbound policy of a peer is identified, the update group membership of the peer is resolved.

23 Claims, 8 Drawing Sheets

METHOD AND APPARATUS FOR BORDER GATEWAY PROTOCOL CONVERGENCE USING UPDATE GROUPS

FIELD OF INVENTION

The invention generally relates to routing policies in packet-switched communication networks, and, more specifically, relates to methods and apparatus for Border Gateway Protocol convergence using update groups.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

When a router of a packet-switched network boots up, in certain approaches the router initiates border gateway protocol (BGP) sessions with BGP peers in the network. Then, the router learns routes in the network from the peers and generates routing information, such as best path information, for each BGP route based on information received from peers. The router may also generate routing information based on configuration or based on information received from other routers using a method outside BGP. The router then "advertises" the best path information to peers. The best path information that is sent may be called an update message. Prior to receiving advertised routes, a peer may be configured. Configuring peers and advertising a set of updates to multiple peers may occupy valuable resources, may require a great deal of messages to be formatted, and may be considered a costly overhead. This overhead slows convergence time as the number of peers on a BGP router increases. "Convergence" is the process by which all peers acquire complete and consistent route information.

BGP update messages may be grouped together into peer groups based on configuration, and update messages may be sent to the whole group. Grouping update messages together based on peer-group configuration may reduce the amount of system processing resources needed to generate updates for a routing table. This method, however, has the following limitations:

All peers that share the same peer-group configuration must share the same outbound routing policies and session characteristics; and Even if peers in different peer groups have the same outbound policy, they cannot share update messages. The update messages for each peer group are generated/formatted independently.

As a result of these limitations, network operators often configure smaller peer-groups. This reduces the efficiency of update message processing. It would be useful to overcome the aforementioned overhead problems and limitations.

BRIEF DESCRIPTION OF THE DRAWINGS

The disclosed subject matter is depicted by way of representative examples, and not by way of limitation, in the illustrations of the accompanying figures, which include.

DETAILED DESCRIPTION OF THE INVENTION

A method and apparatus for Border Gateway Protocol convergence using update groups is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

I. General Overview

A method and apparatus are disclosed for Border Gateway Protocol convergence using update groups. Methods and apparatuses are disclosed for generating and managing update groups. In one aspect, when a change in the outbound policy of a peer is identified, the update group membership of the peer is resolved.

In an embodiment, the peers in an update group may share the same update messages. Additionally, the disclosed subject matter separates the generation and replication of update messages from peer-group configuration, which improves convergence time and flexibility of peer configuration. No manual configuration by the network operator is required, and the need to configure peer groups for update replication is eliminated. Optimal update message generation occurs automatically and independently. In an embodiment, CPU utilization and transient memory utilization are reduced.

II. Establishing Update Groups

Figure 1:
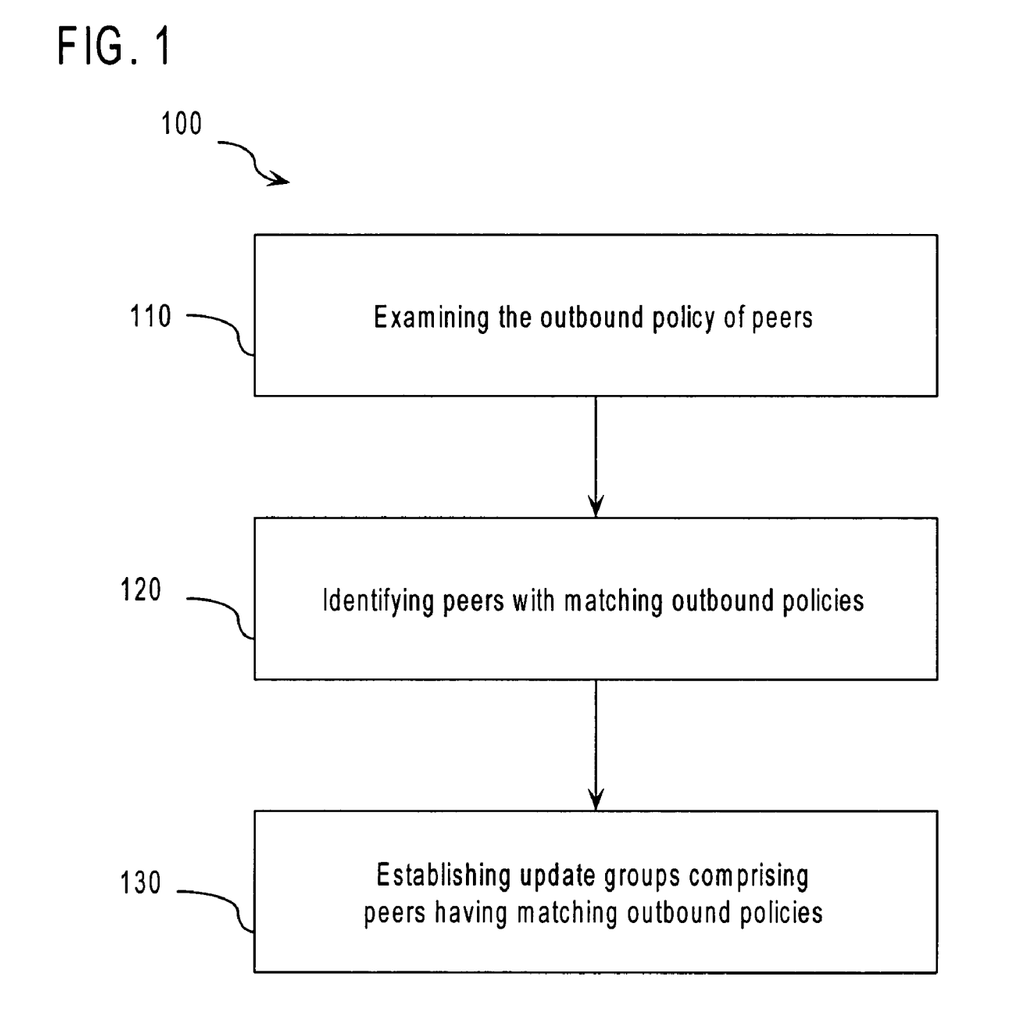
FIG. 1 is a flow chart of an embodiment of a method for establishing update groups.

FIG. 1 is a flow chart of an embodiment of method 100 for establishing update groups.

The term "peer" may refer to a router, switch, gateway, hub, or other element of network infrastructure. Method 100 includes step 110, in which the outbound policies of peers are examined as one step in the formation of update groups. An update group is a set of one or more peers having matching outbound policies. Update groups may also be referred to as "dynamic peer groups." An outbound policy is generally any configuration for a peer that could affect the set of update messages sent to the peer, or the content of those update messages. For example, outbound policy may include items such as (i) advertisement interval, (ii) information related to autonomous systems, such as local autonomous systems or private AS, including information related to the removal of a private autonomous system, (iii) information related to route reflector (RR) clients, (iv) information related to the calculation of next-hop attributes, such as next-hop-self, (v) information relating to the suppression or unsuppression of routes, such as an unsuppress map, (vi) policy which filters out certain updates depending on the attributes they contain, or modifies the attributes contained in an update, such as route maps, outbound filter lists and outbound prefix lists, as well as other relevant outbound policy information. Step 110 may comprise retrieving policy information for each peer identified in the peer policy database for a particular peer.

Step 120 includes identifying peers with matching outbound policies. In an embodiment, peers may be considered to have matching outbound policies if all of the outbound policy information of the peers is equivalent. In other embodiments, peers may be considered to have matching outbound policies if certain components of the outbound policy are equivalent, substantially equivalent, or meet a predetermined or dynamically determined criteria. In an embodiment, step 120 includes reviewing and testing policy information for all configured BGP peers of a particular peer.

In step 130, update groups are established. An update group may include any number of peers having matching outbound policies. An update group may include any number of peers having matching outbound policies. One embodiment includes a structure representing an update group. The structure holds the values for all of the various items of outbound policy shared by the peers in the update group. The structure also holds a pointer to the list of peers in the update group. Each peer also contains values for its own outbound policy configuration, and each peer also contains a pointer to the next peer in the list.

When Border Gateway Protocol is using multiple address families, in an embodiment, each update group is associated with a particular address family, and a single peer may belong to a different update group for each address family. This arrangement may be used as most outbound policy can be configured separately for each address family, and updates are generated independently for each address family.

In another embodiment, in respect of a multiple peers having matching outbound policies, multiple update groups may be established, each such update group holding a certain quantity of the peers.

Figure 2:
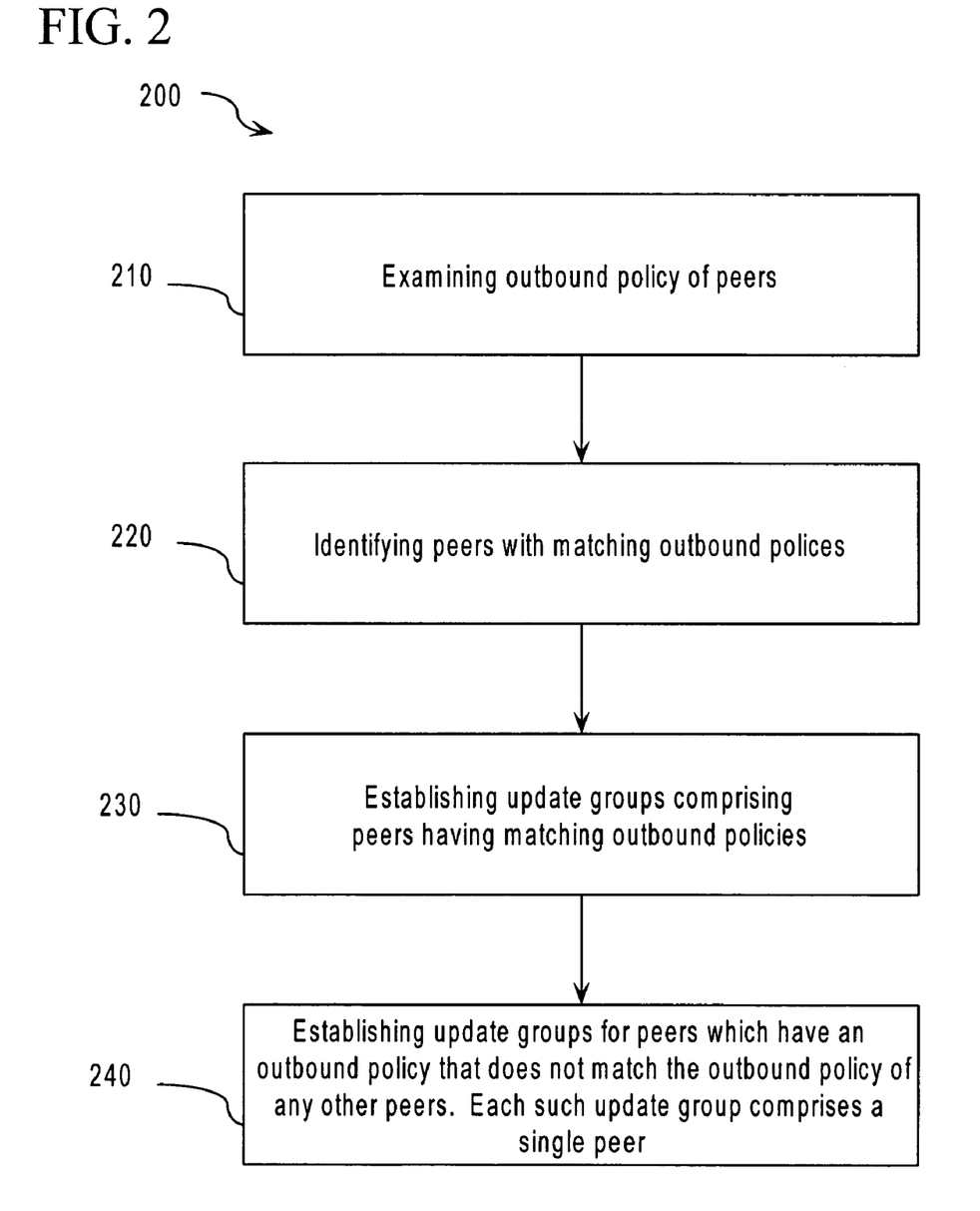
FIG. 2 is a flow chart of an embodiment of a method for establishing update groups, including an update group for a peer with an outbound policy that does not match the outbound policy of any other peers.

FIG. 2 is a flow chart of an embodiment of method 200 for establishing update groups for peers that have an outbound policy which does not match the outbound policy of any other peers. Each such update group comprises a single peer.

In this embodiment of method 200, an update group may also be established in respect of a peer with an outbound policy that does not match the outbound policy of any other peer. Such an update group will only include one peer when it is established. However, peers that are later found to have an outbound policy matching such an update group with only one peer can be added to the update group. Method 200 may include step 210, step 220, and step 230, which are, in an embodiment, analogous, respectively, to step 110, step 120 and step 130 of method 100.

In step 240, as described above, one or more update groups are established with single peers that have outbound policies that do not match the outbound policy of any other peers.

Update groups may be established automatically, without explicit configuration, and, as described below, update group membership may also be revised automatically.

III. Managing Update Groups

Approaches for managing update groups are disclosed. One aspect of management includes resolving the membership status of a peer when its outbound policy is changed.

Figure 3:
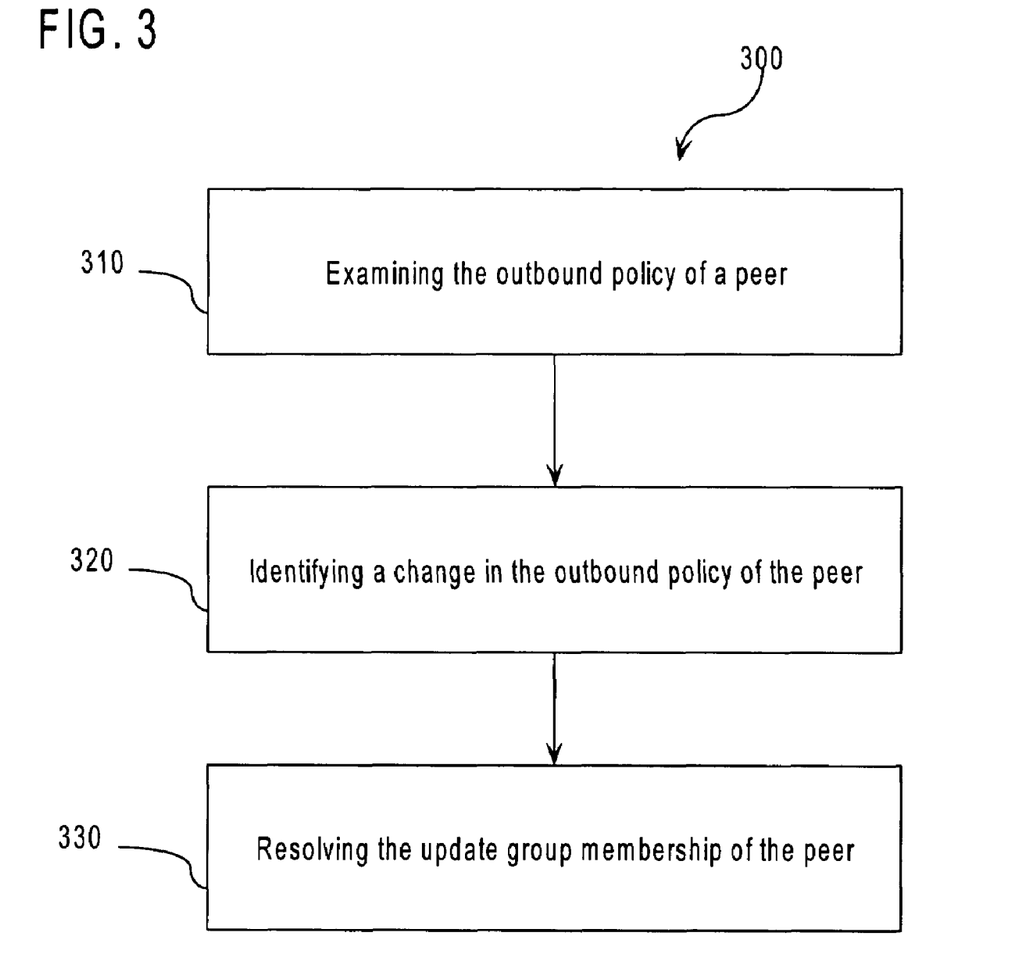
FIG. 3 is a flow chart of an embodiment of a method for managing update groups.

FIG. 3 is flow chart of an embodiment of method 300 for managing an update group.

Step 310 includes examining the outbound policy of a peer. As in step 110 and step 210, step 310 may comprise retrieving policy information for each peer identified in the peer policy database for a particular peer.

Step 320 includes identifying a change in the outbound policy of the peer. A change in the outbound policy of a peer may include a change to one or more specific aspects of outbound policy that are described above, or, may include changes to other aspects of outbound policy that were not specifically named above. In an embodiment, a change in outbound policy is identified by receiving and executing a configuration change command that requests a peer to modify its outbound policy information relating to another peer.

Step 330 includes resolving the update group membership of a peer that has undergone a change in outbound policy. Resolving update group membership includes performing steps aimed toward organizing peers in appropriate update groups after they have undergone a change in outbound policy. For example, a particular configuration change may modify a policy parameter value so that a peer must be placed in a different update group. Further, the process of FIG. 4 may be used. Alternatively, when certain types of changes occur, update group membership is not resolved.

Figure 4:
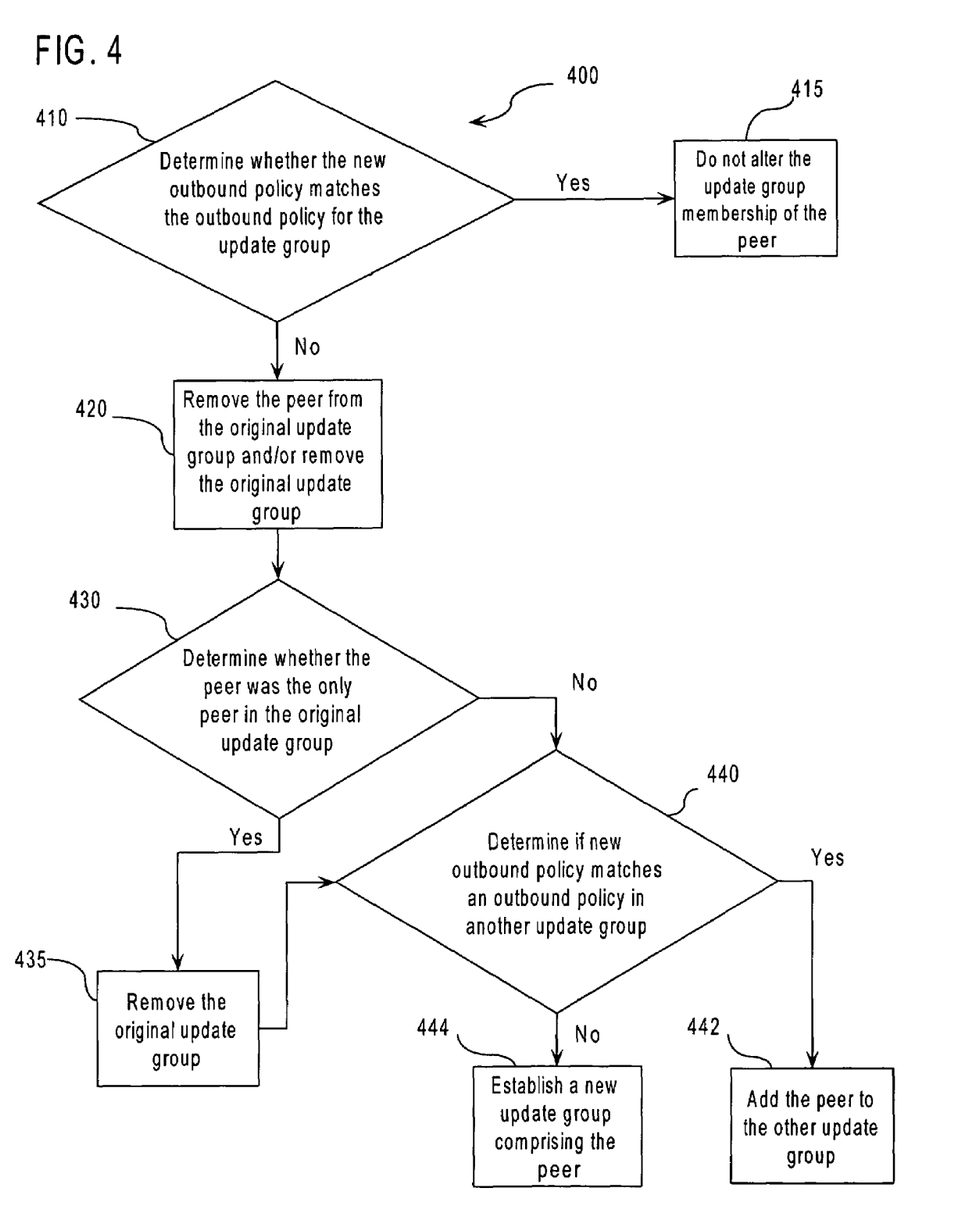
FIG. 4 is a flow chart of a first embodiment of a method for resolving the update group membership of a peer that has undergone a change in outbound policy.

FIG. 4 is a flow chart of an embodiment of method 400 for resolving the update group membership of a peer in an update group.

Step 410 includes determining whether the new outbound policy for a peer matches an outbound policy for all the other peers in the update group of which the peer is a member. Alternatively, step 410 involves testing whether the new outbound policy of the peer matches the outbound policy associated with the update group.

If it is determined that the policy change matches an outbound policy of another peer in the update group or an outbound policy associated with the update group, the group membership of the peer is not altered, as shown in step 415. For example, the peer may remain a member of the update group in which it is currently a member.

If it is determined, in step 410, that the changed outbound policy does not match an outbound policy of another peer in the update group or an outbound policy associated with the update group, as shown in step 420, the peer may no longer be an appropriate member of the update group, and the peer may be removed from the update group and moved to another update group.

As shown in step 430, in an embodiment, method 400 included step 430 for determining whether the peer was the only peer in the update group.

If the peer was the only peer in the update group, the update group may be removed, as shown in step 435. Alternatively, the update group's parameters may be updated to reflect the outbound policies and parameters of the newly changed peer's parameters. If the peer was not the only peer in the original update group, as shown in step 430, the update group will not be removed, and may continue to be used for other peers.

As shown in step 440, a determination is made as to whether the new outbound policy of the peer matches an outbound policy of another update group. As shown in step 442, if the policy of the peer matches an outbound policy of another update group, the peer will be added to the other update group.

If the new outbound policy of the peer does not match the outbound policy of any other update group, then, in an embodiment, a new update group will be established, and the peer will be added to the new update group, as shown in step 444. The peer with the changed outbound policy will be the initial member of the new update group, but, if other peers with a matching outbound policy subsequently are arise or are found, they may be added to the new update group.

Figure 5:
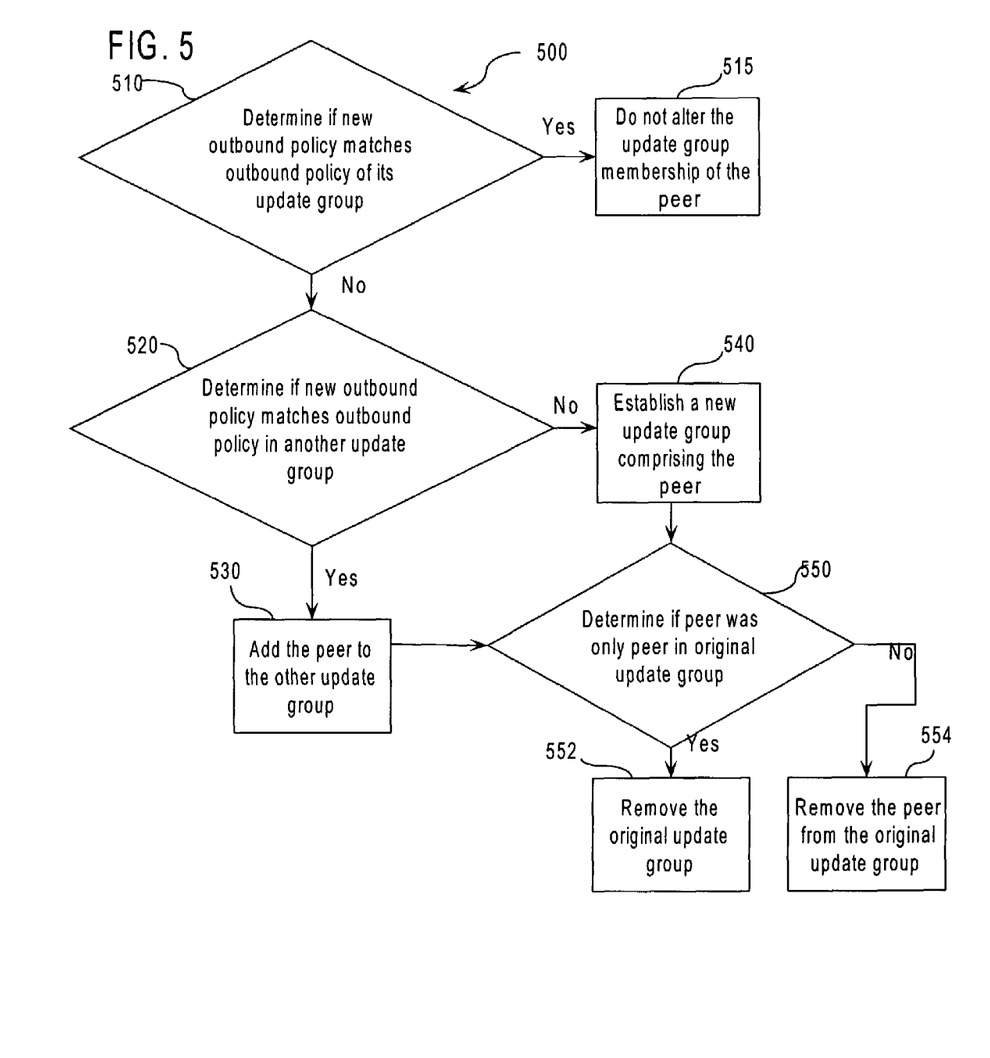
FIG. 5 is a flow chart of a second embodiment of a method for resolving the update group membership of a peer that has undergone a change in outbound policy.

Steps of method 400 may be carried out in various orders or modified, and still fall under the scope and spirit of the disclosed method. For example, FIG. 5 is a flow chart of an embodiment of method 500, which is an alternative to method 400, for resolving the update group membership of a peer that has undergone a change in outbound policy.

Step 510 includes determining whether the new outbound policy of a peer matches an outbound policy of another peer in the update group in which the peer is a member, or, in embodiments, whether the new outbound policy of the peer matches an outbound policy associated with the update group. If it is determined that the policy change matches the outbound policy all other peers in the update group, the group membership of the peer is not altered, as shown in step 515. For example, the peer may remain a member of the update group in which it is currently a member.

As shown in step 520, when, in step 510, it is determined that the new outbound policy does not match an outbound policy of another peer in the update group or, in embodiments, does not match an outbound policy associated with the update group, a determination may be made as to whether the new outbound policy of the peer matches an outbound policy of another update group.

As shown in step 530, if the policy of the peer matches and outbound policy of another update group, the peer will be added to the other update group. If the new outbound policy of the peer does not match the outbound policy of any other update group, then, in an embodiment, a new update group will be established, and the peer is added to the new update group, as shown in step 540. The peer with the changed outbound policy is the initial member of the new update group, but, if other peers with a matching outbound policy come about, they may be added to the new update group.

As shown in step 550, regardless of whether the new outbound policy matched an outbound policy in another update group (as determined in step 520), in an embodiment, method 500 includes step 550 for determining whether the peer was the only peer in the original update group. If the peer was the only peer in the original update group, the peer is removed from the original update group and/or the original update group is removed, as shown in step 552. If the peer was not the only peer in the original update group, as shown in step 554, the peer may be removed from the original update group.

The aforementioned approaches may be performed on a single peer or update group, or may be performed on multiple peers or update groups. Additionally, the aforementioned approaches may be used to process a single update or multiple updates.

III. Using Update Groups and Grouping Updates

Methods and apparatuses are also disclosed for using update groups. In one embodiment, after update groups of peers have been established, the update groups may be used in the processing of updates.

Figure 6:
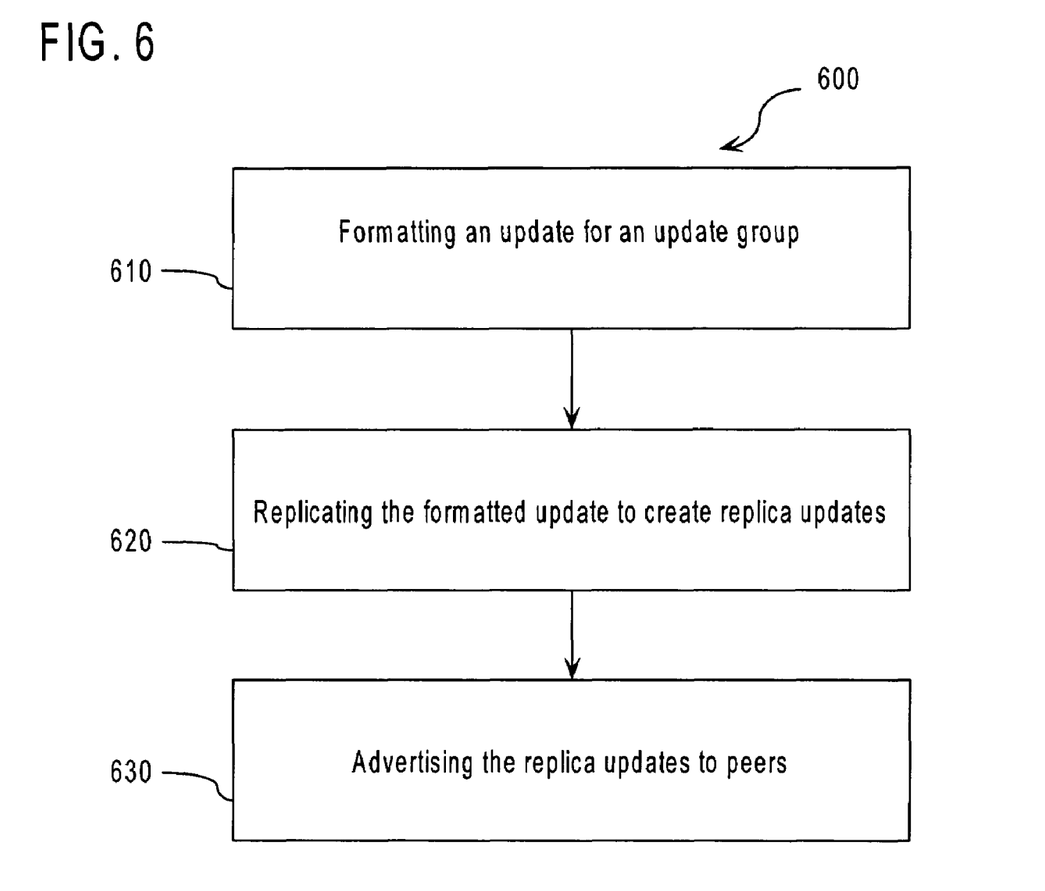
FIG. 6 is a flow chart of an embodiment of a method for processing updates.

FIG. 6 is a flow chart of an embodiment of method 600 for using update groups in the processing of updates. Step 610 includes formatting updates for an update group. In an embodiment, formatting an update means building the actual update message data that will be sent to the peer, based on the routing information held by the router and on the outbound policy for the peer. In order to format the updates, the router must determine which prefixes need to be advertised or withdrawn, and must calculate the values of the attributes for each prefix being advertised. The determination of which prefixes need to be advertised or withdrawn includes executing any outbound policy configured by the user which has the effect of filtering out prefixes which would otherwise be advertised (e.g., prefix-lists or filter-lists).

For some attributes, calculating the value simply involves copying the value from the information held in the router's BGP routing table, but for others some more complex processing is required. In either case, any outbound policy configured by the user which can alter the value of the attributes (e.g., route-maps) must be executed. Which prefixes are advertised or withdrawn, and the attributes which are included in the message, also depend on the type of peer to which the update will be sent, e.g., whether or not it is in the same AS as the router, and whether it is an route-reflector client. These also fall under the definition of outbound policy as described above. In an embodiment, formatting updates is performed as follows:

(1) The router selects an update-group for which it will format updates (or alternatively, selects a peer for which it will format updates, as a representative of the update-group that that neighbor belongs to).

(2) The router then iterates through the database of BGP routes. For each route, it determines whether it needs to be advertised or withdrawn.

(3) If the route needs to be withdrawn, the corresponding prefix is added to an update message containing prefixes to withdraw (such an update message is created is one does not already exist).

(4) If the route needs to be advertised, the router calculates the set of attributes, and their values, that apply to the route. If there is already an update message containing those attributes/values, the prefix for the route is added to it. If not, then a new update message is formed containing those attributes, and then the prefix is added to it.

(5) When all the routes have been processed, the router can start sending the updates to the peers in the update-group (e.g., by using one of the methods described above).

Step 620 includes replicating the formatted update to create replica updates. The replica updates may then be advertised to peers in the update group. In an embodiment, replica updates may be transmitted to each peer in an update group. In another embodiment, an original formatted update is sent to one peer in the update group, and replica updates are sent to the remaining peers in the update group. In a third embodiment, no replication is performed. Rather, the original formatted update is sent to multiple peers in an update group. In this embodiment, additional information must be maintained to track which peers have been sent the update an any point in time, because different peers may consume updates at different rates.

The method of 600 may follow, or include, other steps, such as, for example, configuring peers and/or establishing update groups, and, all such combinations of steps fall within the claimed subject matter.

Figure 7:
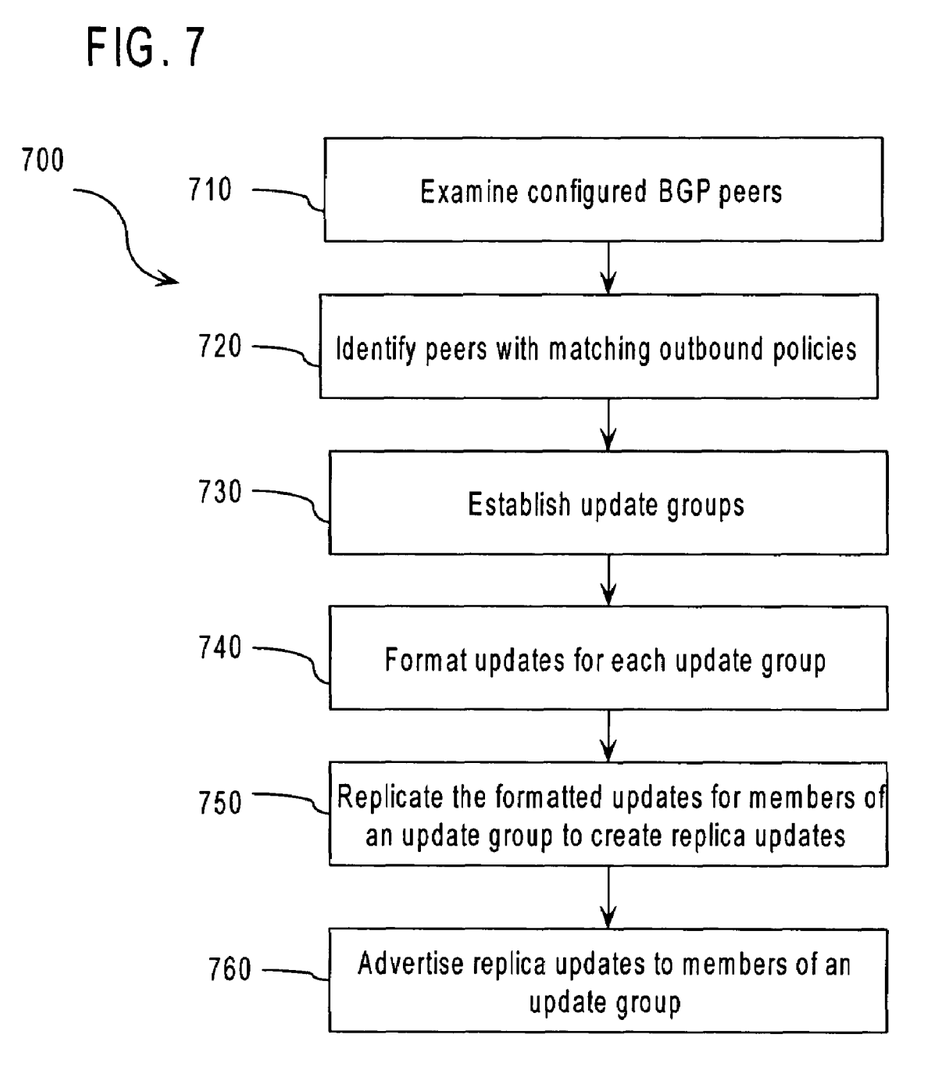
FIG. 7 is a flow chart of an embodiment of method processing of updates, comprising additional steps.

For example, FIG. 7 is a flow chart of an embodiment of method 600 for using update groups in the processing of updates, comprising additional steps.

In an embodiment, method 700 includes step 710, in which the outbound policies of configured BGP peers are examined. Step 720 includes identifying peers with matching outbound policies. Step 730 includes establishing update groups of peers having matching outbound policies, based on the results of step 720. Steps 710, 720, and 730 are analogous to steps 110, 120 and 130 of method 100.

Steps 740, 750 and 760 include formatting, replicating and advertising updates, and, respectively, are analogous to steps 610, 620 and 630 of method 600.

In embodiments, methods 600 and 700 may contain additional steps whereby formatted messages are stored in caches. In an embodiment, a separate cache is associated with each update group. Messages are retrieved from the caches and advertised to their respective update groups. In another embodiment, various update groups having different outbound policies may share a cache or other storage medium that stores updates which are common to the different update groups. The common updates may be advertised to the relevant update groups. In this manner, updates may be shared and/or reused by update groups with different outbound policies. In such embodiments, methods 600 and 700 may contain a step of determining whether an update is shared by multiple update groups having different outbound policies. The update may be stored in a common cache or other storage medium that is associated with the update groups. If the update is shared, two or more update groups may share the same update. Such step(s) could be done at step 750, which involves replication, or such step(s) may be performed at other points in the described methods.

The methods described above also disclose approaches in which updates may be grouped according to outbound policy. The updates may then be advertised to an update group, which includes peers that have such an outbound policy.

V. Implementation Details

According to one manner of implementation, update groups are established at configuration time and any subsequent policy changes through are handled through callbacks. In an embodiment, three primary functional areas are implemented. These areas include: (i) establishing update groups on demand when neighbors (e.g., peers) or their outbound policies are configured or altered, (ii) using update groups when generating and replicating updates, and (3) commands for the maintenance and troubleshooting of update groups.

When a peer is configured, a list of update groups will be evaluated to check if there is a pre-existing update group that has outbound policies that match the outbound policies of the peer. If not, a new update group will be established and added to the list of update groups. If a matching, existing update group is found, the peer will be added to its member list.

Thereafter, whenever the outbound policies are reconfigured for a peer, the peer's membership in its update group will be re-calculated (i.e., resolved).

When generating updates, the list of update groups will be walked, rather than the list of peers. For each update group, a set of updates will be generated for the whole group, and the updates will then be replicated and enqueued to the members of the update group.

In order to avoid re-calculating the update group for a peer many times in quick succession, a per-peer timer is employed. Update groups are established after the time has expired. In one embodiment, in the establishment process, the following functions will be created:

bgp_updgrp_init( )
Initialize the update group from the peer data
bgp_updgrp_create( )—Create update group
Allocate structure
Initialize from peer data through bgp_updgrp_init( )
bgp_updgrp_find_or_create( )—Find a matching update group or create a new one
If peer already has an update group, then we see if the policy of the peer still matches with the update group. If not & only member of the update group, re-initializes the update group and calls
bgp_updgrp_merge( ). Else, if update group has more members, remove the peer from old update group and add to new update group. If no pre-existing update group, calls bgp_updgrp_match( ).
If none is found, calls bgp_updgrp_create( ).
bgp_updgrp_compare( )
Compare two update groups to determine of they are the same
bgp_updgrp_merge( )
Merge a newly changed update group with another existing one. If initializing an update group with new data results in a possibly duplicate update group, merge it with the existing one.
bgp_updgrp_delete( )
Delete update group. Free structure.
bgp_updgrp_add_nbr( )—Add peer to update group
Add peer into update group list. If peer established, add to update group's update generation list
bgp_updgrp_rm_nbr( )—Remove peer from update group
Remove from update group, copying outstanding messages onto the queue if necessary. If update group has no more peers, call bgp_upd_grp_delete( ).
bgp_updgrp_match( )—Find update group that matches the peer
The following fields in the peer and update group structures need to be compared. If they all match, the peer can be added to the update group, otherwise it cannot be added to the update group:
Either both are IBGP or both EBGP
If IBGP—whether both are RR-client or neither is
Same address-family
Prefix list ORF Receive Capability not configured
Send-community configured or not configured (should be same)
Send-extcommunity configured or not configured (should be same)
send-label configured or not configured (should be same)
nexthop-self configured or not configured (should be same)
nexthop-unchanged configured or not configured (should be same)
use-nexthop-attr configured or not configured (should be same)
default-originate and default-map
Advertisement interval
Local AS [no prepend]
Remove-private-AS
Unsuppress-map
Outbound route-map
Outbound filter-list
Outbound prefix-list
Outbound distribute-list
Conditional advertisement: advertise-map & nonexist-map
In case of ipv6 send-link-local configured or not configured (should be same)

A number of commands are also introduces to facilitate end user interfaces. Specifically, the following show, debug and clear commands will be introduced:

Show Commands
show ip bgp update group
Show all update groups. This is analogous to "show ip bgp peer-group"show ip bgp update group <peer-address>
Show the update group containing the peer with IP address <peer-address>. show ip bgp update group <index>
Show the update group with index <index>. This is analogous to "show ip bgp peer-group <tag>"
The output of the sh ip bgp update group commands is as follows:
BGP version 4 update group 1, external, Address family: IPv4 Unicast
BGP Update version: 0, messages 0/0
Update messages formatted 0, replicated 0
Number of NLRIs in the update sent: max 0, min 0
Minimum time between advertisement runs is 30 seconds
Has 8 members:
10.0.101.1    10.0.101.2    10.0.101.3    10.0.101.4
10.0.101.5 10.0.101.6
10.0.101.7
10.0.101.8
show ip bgp update group <index> summary
Show summary details for the peers in the specified update group.
This is analogous to "show ip bgp peer-group <tag> summary"
show ip bgp update group <peer-address> summary
Show summary details for the peers in the specified update group.
This is analogous to "show ip bgp peer-group <tag> summary"
show ip bgp update group summary
Show summary details for all update groups. This is analogous to "show ip bgp peer-group summary"
show ip bgp replication
The output of the command is as follows:
BGP Total Messages Formatted/Enqueued: 0/0 router, or a network, and may be implemented as a standalone mechanism. Furthermore, the approach may be implemented in computer software, hardware, or a combination thereof.

Figure 8:
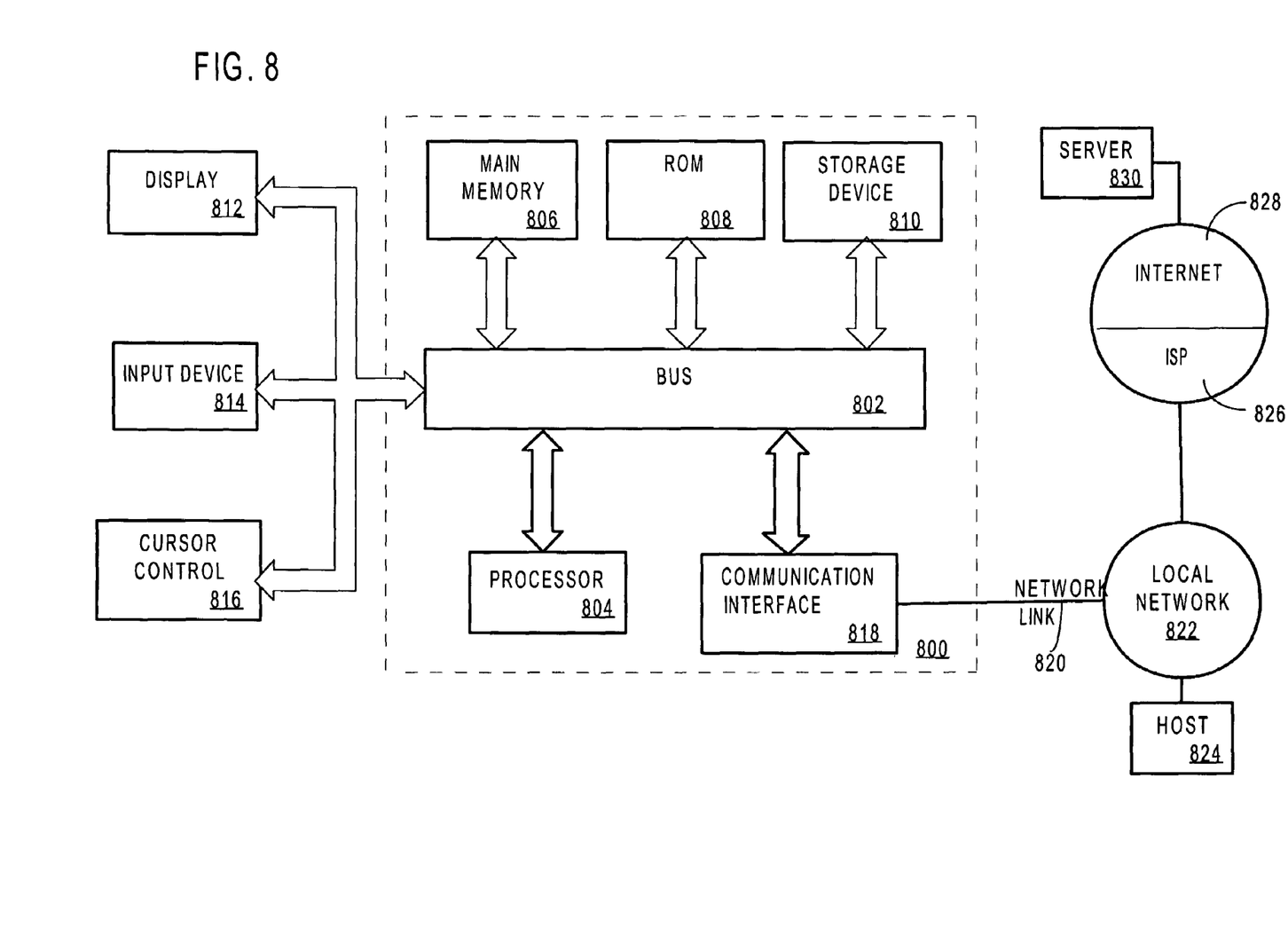
FIG. 8 is a block diagram of an embodiment of a system may be used to implement the disclosed subject matter.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor

| Index | Type | Members | Leader | TblVer | MsgFmt | MsgRepl | Csize | Qsize |
|---|---|---|---|---|---|---|---|---|
| 1 | external | 8 10.0.101.1 | 0 | 0 | 0 | 0 | 0 | 0 |
| 2 | external | 8 10.0.101.21 | 0 | 0 | 0 | 0 | 0 | 0 |

Debug Commands
debug ip bgp update group [<index>|<peer-address>]
Debug the allocation and peer-removal from an update group
Clear Commands
clear ip bgp update group [<index>|<peer-address>]
Clear the update group member sessions. In absence of a parameter, recalculate update group memberships.

In an embodiment, the aforementioned approaches are implemented in a BGP protocol module or agent within an internetworking operating system in a router. A processor located in the router examines the peer groups, which are stored in router volatile memory. Formatting, replication and advertising is done in a BGP protocol module or agent within an internetworking operating system in a router However, the approach for establishing and using update groups may be implemented in a variety of ways and the invention is not limited to any particular implementation. The approach may be integrated into, as stated above, a 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

We claim:

1. A method comprising:
   examining outbound policies of a plurality of peers;
   identifying, among the plurality of peers, peers that have matching outbound policies; and
   establishing one or more update groups, each update group comprising peers having matching outbound policies, as identified by the identifying step;
   formatting an update for a particular update group, wherein the particular update group comprises peers having matching outbound policies;
   transmitting the update to the peers in the particular update group;
   examining a particular outbound policy of a particular peer in a particular update group;
   identifying a change in the outbound policy of the particular peer, wherein said change is comprised of a change from a first outbound policy to a second outbound policy; and
   changing an update group membership of the particular peer based on the change that is identified.

2. The method of claim 1, further comprising establishing an update group to comprise a peer with an outbound policy that does not match the outbound policy of any other peer.

3. The method of claim 1, wherein said one or more update groups are established at configuration.

4. The method of claim 1, wherein resolving an update group membership of said peer comprises determining whether said second outbound policy does not match an outbound policy of another peer in the update group, further comprising if it is determined that the second outbound policy does not match an outbound policy of another peer in the update group, removing the peer from the update group.

5. The method of claim 1, wherein resolving an update group membership of said peer comprises determining whether said peer is the only peer in the update group; further comprising: if said peer is the only peer in the update group, removing the update group.

6. The method of claim 1, wherein resolving an update group membership of the peer comprises determining whether a different update group comprises a peer having an outbound policy that matches the second outbound policy, further comprising: if it is determined that a different update group comprises a peer with an outbound policy matching the second outbound policy, adding the peer having changed outbound policy to the different update group.

7. The method of claim 6, further comprising: if it is determined that no different update group comprises a peer having an outbound policy matching the second outbound policy, establishing a new update group comprising the peer having changed outbound policy.

8. The method of claim 1, wherein the change in outbound policy is identified by receiving and executing a configuration change command that requests a peer to modify its outbound policy information relating to another peer.

9. A system comprising:
means for examining the outbound policy of a plurality of peers; and
means for identifying, among the plurality of peers, peers having matching outbound policies;
means for establishing one or more update groups, each update group comprising peers having matching outbound policies, as identified by the identifying step;
means for formatting an update for a particular update group, wherein the particular update group comprises peers having matching outbound policies;
means for transmitting the update to the peers in the particular update group;
means for examining a particular outbound policy of a particular peer in a particular update group;
means for identifying a change in the outbound policy of said peer, wherein said change is comprised of a change from a first outbound policy to a second outbound policy; and
means for changing an update group membership of said peer based on the change that is identified.

10. A method of advertising updates to peers by a router using a border gateway protocol comprising:
examining a plurality of peers of a border gateway protocol router;
determining peers having matching outbound policies;
establishing one or more update groups comprising peers with matching outbound policies;
formatting updates for an update group;
for an update group, generating a replica update for at least one member of an update group;
advertising the replica update to the at least one member;
examining a particular outbound policy of a particular peer in a particular update group;
identifying a change in the outbound policy of said peer, wherein said change is comprised of a change from a first outbound policy to a second outbound policy; and
changing an update group membership of said peer based on the change that is identified.

11. The method of claim 10, wherein the peer is a first peer and resolving the update group membership status of the first peer comprises:
determining whether a new outbound policy of the peer does not match an outbound policy of a second peer in the update group; and
if it is determined that a new outbound policy of the peer does not match an outbound policy of a second peer in the update group, removing the peer from the update group.

12. The method of claim 10, wherein the update group is a first update group and resolving the update group membership status of the first peer comprises:
determining whether a new outbound policy of the peer matches an outbound policy of a peer in a second update group, wherein said second update group is not the first update group; and
if it is determined that a new outbound policy of the peer matches an outbound policy of a peer in a second update group, adding the peer to the second update group.

13. The method of claim 10, further comprising establishing an update group to comprise a peer with an outbound policy that does not match the outbound policy of any other peer.

14. A computer-readable medium carrying one or more sequences of instructions which, when executed by one or more computer processors, causes the one or more computer processors to perform:
examining outbound policies of a plurality of peers;
identifying, among the plurality of peers, peers that have matching outbound policies;
establishing one or more update groups, each update group comprising peers having matching outbound policies, as identified by the identifying step;
formatting an update for a particular update group, wherein the particular update group comprises peers having matching outbound policies;
transmitting the update to the peers in the particular update group;
examining a particular outbound policy of a particular peer in a particular update group;
identifying a change in the outbound policy of said peer, wherein said change is comprised of a change from a first outbound policy to a second outbound policy; and
changing an update group membership of said peer based on the change that is identified.

15. The system of claim 9, further comprising means for establishing an update group to comprise a peer with an outbound policy that does not match the outbound policy of any other peer.

16. The system of claim 9, wherein said one or more update groups are established at configuration.

17. The system of claim 9, wherein the means for resolving an update group membership of said peer comprises means for determining whether said second outbound policy does not match an outbound policy of another peer in the update group, further comprising means for removing the peer from the update group if it is determined that the second outbound policy does not match an outbound policy of another peer in the update group.

18. The system of claim 9, wherein the means for resolving an update group membership of said peer comprises means for determining whether said peer is the only peer in the update group; further comprising means for removing the update group if said peer is the only peer in the update group.

19. The system of claim 9, wherein the means for resolving an update group membership of the peer comprises means for determining whether a different update group comprises a peer having an outbound policy that matches the second outbound policy, further comprising means for adding the peer having changed outbound policy to the different update group if it is determined that a different update group comprises a peer with an outbound policy matching the second outbound policy, adding the peer having changed outbound policy to the different update group.

20. The system of claim 9, further comprising means for establishing a new update group comprising the peer having changed outbound policy if it is determined that no different update group comprises a peer having an outbound policy matching the second outbound policy.

21. The system of claim 9, wherein the change in outbound policy is identified by receiving and executing a configuration change command that requests a peer to modify its outbound policy information relating to another peer.

22. An apparatus, comprising:
- a network interface configured to couple to a data processing network comprising a plurality of border gateway protocol (BGP) peer devices;
- a computer-readable medium carrying one or more sequences of instructions which, when executed by one or more computer processors, causes the one or more computer processors to perform:
- examining outbound policies of a plurality of peers;
- identifying, among the plurality of peers, one or more peers that have matching outbound policies;
- establishing one or more update groups, each update group comprising the one or more peers having matching outbound policies;
- formatting an update for a particular update group, wherein the particular update group comprises one or more peers having matching outbound policies;
- transmitting the update to the one or more peers in the particular update group;
- examining a particular outbound policy of a particular peer in the particular update group;
- identifying a change in the outbound policy of the particular peer, wherein said change is comprised of a change from a first outbound policy to a second outbound policy that is different from the first outbound policy;
- in response to identifying the change, removing the particular peer from the particular update group;
- determining whether the particular peer was the only peer in the particular update group and in response thereto, removing the particular update group;
- determining whether a different update group comprises another peer having an outbound policy that matches the second outbound policy, and in response thereto, adding the particular peer to the different update group, and establishing a new update group comprising the particular peer policy if it is determined that no different update group comprises another peer having an outbound policy matching the second outbound policy.

23. The apparatus of claim 22, comprising further instructions which when executed cause identifying the change in outbound policy by receiving and executing a configuration change command that requests the particular peer to modify its outbound policy information relating to another peer.

* * * * *